(12) United States Patent
Price et al.

(10) Patent No.: US 8,778,854 B2
(45) Date of Patent: Jul. 15, 2014

(54) DISPERSANT VISCOSITY MODIFIERS

(75) Inventors: David Price, Littleover (GB); William R. S. Barton, Belper (GB); Michael R. Sutton, Matlock (GB); Mark C. Davies, Belper (GB)

(73) Assignee: The Lubrizol Corporation, Wickliffe, OH (US)

( * ) Notice: Subject to any disclaimer, the term of this patent is extended or adjusted under 35 U.S.C. 154(b) by 257 days.

(21) Appl. No.: 13/382,555

(22) PCT Filed: Jul. 6, 2010

(86) PCT No.: PCT/US2010/041035
§ 371 (c)(1),
(2), (4) Date: Mar. 28, 2012

(87) PCT Pub. No.: WO2011/005739
PCT Pub. Date: Jan. 13, 2011

(65) Prior Publication Data
US 2012/0178659 A1    Jul. 12, 2012

Related U.S. Application Data

(60) Provisional application No. 61/223,811, filed on Jul. 8, 2009.

(51) Int. Cl.
*C10M 169/04* (2006.01)
*C08F 267/04* (2006.01)
*C10M 149/00* (2006.01)
*C10M 145/06* (2006.01)

(52) U.S. Cl.
USPC .................. 508/306; 508/588; 525/285

(58) Field of Classification Search
CPC .............. C10M 2205/066; C10M 2209/084
USPC .................... 508/306, 588; 525/285
See application file for complete search history.

(56) References Cited

U.S. PATENT DOCUMENTS

| | | | |
|---|---|---|---|
| 5,013,469 A | 5/1991 | DeRosa et al. | |
| 5,205,949 A | 4/1993 | Nalesnik et al. | |
| 6,610,801 B1 * | 8/2003 | Scherer | 526/135 |
| 6,818,601 B1 | 11/2004 | Lange | |
| 2010/0152082 A1 * | 6/2010 | Price et al. | 508/508 |

FOREIGN PATENT DOCUMENTS

| | | |
|---|---|---|
| EP | 0329254 | 8/1989 |
| EP | 0921136 | 6/1999 |
| WO | 2011/005740 | 1/2001 |

OTHER PUBLICATIONS

International Publication No. WO 2011/005739 and Search Report published Jan. 13, 2011.
Written Opinion from International Application No. PCT/US2010/041035 dated Sep. 6, 2010.
Fanglin Ning et al., "Synthesis of Amphiphilic Block-Graft Copolymers [Poly(styrene-b-ethylene-co-butylene-b-styrene)-g-Polyacrylic acid]", Journal of Polymer Science Part A Polymer Chemistry, vo. 40, 2002 pp. 1253-1266, XP-002599080.

* cited by examiner

*Primary Examiner* — Vishal Vasisth
(74) *Attorney, Agent, or Firm* — David M. Shold, Esq; Michael F. Esposito, Esq

(57) ABSTRACT

The disclosed invention relates to a composition comprising a grafted polymer. The polymer comprises a backbone with at least one olefin block and at least one vinyl aromatic block. The polymer is grafted with a pendant carbonyl containing group, the grafting being conducted by halogenating the vinyl aromatic carbon of the vinyl aromatic block and then grafting a carboxylic acid or derivative thereof on the halogenated vinyl aromatic carbon in the presence of an activating agent. The carbonyl containing-group is optionally substituted to provide ester, imide and/or amide functionality. The grafted polymer is useful as a dispersant viscosity modifier in lubricating compositions such as engine oils.

14 Claims, No Drawings

DISPERSANT VISCOSITY MODIFIERS

This application is a 371 of PCT/US10/41035, filed Jul. 6, 2010 which claims benefit of 61/223,811, filed Jul. 8, 2009.

FIELD OF INVENTION

This invention relates to dispersant viscosity modifiers and to a process for making the dispersant viscosity modifiers. These dispersant viscosity modifiers are useful as additives for lubricating compositions, for example, engine oils.

BACKGROUND

The use of dispersant viscosity modifiers in engine oils is known.

SUMMARY

There is an increased emphasis in the marketplace on engine oils that provide enhanced fuel economy and longer drain intervals. Existing passenger car motor oil (PCMO) and heavy duty diesel (HDD) engine oil formulations may address both of these issues with partial or total replacement of components that hinder fuel economy, such as polyisobutylene (PIB) based dispersants, with suitably efficient dispersant viscosity modifiers (DVM) to improve fuel economy or provide a boost in soot handling. These polymers may be referred to as bifunctional polymers. Examples of PIB based dispersants include products derived from the reaction of terminal alkene groups of PIB with maleic anhydride followed by treatment of the PIB bound anhydride with polyethylene amines.

The drive for bifunctional polymers of this type has led to the commercialization of olefin copolymer (OCP) based DVMs such as Hitec 5777 (a product of Afton which is believed to be an ethylene-propylene copolymer grafted with maleic anhydride and further reacted with 4-aminodiphenylamine). However, a problem with the use of OCP based DVMs relates to piston deposition which is believed to be caused by OCP degradation. Hydrogenated styrene-butadiene resins (SBR) can be used as viscosity improvers and have been shown to yield lower piston deposition than OCP based DVMs. However, unfunctionalized random copolymers of styrene and butadiene typically provide insufficient soot dispersancy.

When functionalized, SBR based DVMs may provide enhanced soot dispersancy. However, providing an adequate level of functionalization to achieve desirable levels of soot dispersancy can be problematic. This invention provides a solution to this problem.

According to one embodiment, the present invention relates to a composition, comprising: a grafted polymer comprising a polymer backbone and a pendant carbonyl containing group, the polymer backbone comprising at least one of block A and at least one of block B, block A comprising an olefin block, block B comprising a vinyl aromatic block, the mole ratio of block A to the combination of block A plus block B (that is, the mole ratio of monomer units in block A to monomer units in the combination of block A plus block B) being in the range from 0.5 to 0.9; the pendant carbonyl containing group being grafted on block B, the carbonyl containing group being optionally further substituted to provide an ester, imide and/or amide functionality, the grafting of the pendant carbonyl containing group on block B being conducted by halogenating the vinyl aromatic carbon of block B and then grafting a carboxylic acid or derivative thereof on the vinyl aromatic carbon in the presence of an activating agent.

With the inventive grafted polymer, all or substantially all, of the grafting may occur on the vinyl aromatic block. The term "substantially all" refers to at least 70%, or at least 90%, of the grafting occurring on the vinyl aromatic block.

According to a further aspect of the invention, block B is halogenated by contacting block B with a halogen containing compound to form a reaction mixture and radiating the reaction mixture.

According to a still further aspect of the invention, the halogen containing compound comprises a bromine containing compound or chlorine containing compound.

According to a still further aspect of the invention, the activating agent comprises copper (I) bromide and propyl-pyridin-2-ylmethylene amine.

According to a still further aspect of the invention, the grafted polymer comprises a copolymer that is not a tapered copolymer, and block A contains from 20 mol % to 80 mol %, or from 30 mol % to mol 70%, repeat units that contain branched alkyl groups, that is, that contain alkyl branches or alkyl branching groups (such as ethyl groups).

According to a still further aspect of the invention, the grafted polymer comprises a copolymer which is a tapered copolymer, and block A contains from 40 mol % to 80 mol %, or from 50 mol % to 75 mol %, repeat units that contain branched alkyl groups, that is alkyl branches.

According to a still further aspect of the invention, the polymer backbone comprises repeat units derived from an aliphatic diene and repeat units derived from an alkenyl arene.

According to a still further aspect of the invention, the polymer backbone comprises repeat units derived from styrene and butadiene.

According to a still further aspect of the invention, the grafted polymer comprises a diblock copolymer.

According to a still further aspect of the invention, the grafted polymer comprises a sequential block copolymer.

According to a still further aspect of the invention, the carboxylic acid derivative comprises an anhydride, halide, or alkyl ester.

According to a still further aspect of the invention, the carboxylic acid derivative comprises a reaction product of maleic anhydride.

According to a still further aspect of the invention, the grafted polymer has a weight average molecular weight in the range from 1000 to 1,000,000, or in the range from 10,000 to 250,000.

According to a still further aspect of the invention, the grafted polymer has a polydispersity in the range from 1 to 1.6, or in the range from 1.01 to 1.55.

According to a still further aspect of the invention, the grafted polymer comprises double bonds available for hydrogenation and from 50% to 100%, or 90% to 100%, or 95% to 100% of the double bonds available for hydrogenation are hydrogenated.

According to a still further aspect of the invention, the carbonyl containing group is substituted to provide amide and/or imide functionality, the amide and/or imide functionality being provided by a nitrogen containing monomer or an amine.

According to a still further aspect of the invention, the nitrogen containing monomer or amine comprises a primary and/or secondary nitrogen.

According to a still further aspect of the invention, the amine comprises Fast Violet B, Fast Blue BB, Fast Blue RR, aniline, N-alkylanilines, di-(para-methylphenyl)amine, 4-aminodiphenylamine, N,N-dimethylphenylenediamine, naphthylamine, 4-(4-nitrophenylazo)aniline, sulfamethazine, 4-phenoxyaniline, 3-nitroaniline, 4-aminoacetanilide (N-(4-aminophenyl)acetamide)), 4-amino-2-hydroxy-benzoic acid phenyl ester (phenyl amino salicylate), N-(4-aminophenyl)-benzamide, benzylamines, 4-phenylazoaniline, para-ethoxyaniline, para-dodecylaniline, cyclohexyl-substituted naphthylamine, thienyl-substituted aniline, or a mixture of two or more thereof.

According to a still further aspect of the invention, the amine functionality is derived from at least one of N-p-diphenylamine; 4-anilinophenyl methacrylamide; 4-anilinophenyl maleimide; 4-anilinophenyl itaconamide; acrylate and methacrylate esters of 4-hydroxydiphenylamine; the reaction product of p-aminodiphenylamine or p-alkylaminodiphenylamine with glycidyl methacrylate; the reaction product of p-aminodiphenylamine with isobutyraldehyde, derivatives of p-hydroxydiphenylamine; derivatives of phenothiazine; vinylogous derivatives of diphenylamine; or a mixture of two or more thereof.

According to a still further aspect of the invention, the amine comprises aminodiphenyl amine, dimethylaminopropyl amine, aminopropylimidazole, dimethylphenyl amine, 4-(4-nitrophenyl azo) aniline, Fast Blue RR, or a mixture of two or more thereof.

According to a still further aspect of the invention, the invention relates to a concentrate comprising the foregoing composition and a diluent, the weight ratio of the grafted polymer to the diluent being in the range from 1:99 to 99:1, or from 80:20 to 10:90.

According to a still further aspect of the invention, the invention relates to a lubricating composition comprising a major amount of an oil of lubricating viscosity and a minor dispersant viscosity modifying amount of the foregoing composition.

According to a still further aspect of the invention, the lubricating composition further comprises a dispersant, antioxidant, antiwear agent, friction modifier, or a mixture of two or more thereof.

According to a still further aspect of the invention, the lubricating composition is an engine oil, wherein the lubricating composition has at least one of (i) a sulphur content of 0.8 wt % or less, (ii) a phosphorus content of 0.2 wt % or less, or (iii) a sulphated ash content of 2 wt % or less.

According to a still further aspect of the invention, the lubricating composition is an engine oil, and the lubricating composition having a (i) a sulphur content of 0.5 wt % or less, (ii) a phosphorus content of 0.1 wt % or less, and (iii) a sulphated ash content of 1.5 wt % or less.

According to a still further aspect of the invention, the lubricating composition is used as an engine oil for a 2-stroke or a 4-stroke internal combustion engine, a gear oil, an automatic transmission oil, a hydraulic fluid, a turbine oil, a metal working fluid or a circulating oil.

According to a still further aspect of the invention, the lubricating composition is used as an engine oil for a 2-stroke or a 4-stroke marine diesel internal combustion engine.

The process for making the inventive grafted polymer may be referred to as an atom transfer radical polymerization (ATRP) process. The ATRP process is described in U.S. Pat. No. 6,610,801, which is incorporated herein by reference. This process involves the reaction of a transition metal compound with a compound containing a transferable group, often a halide. Under these conditions the transferable group of atoms is transferred to the transition metal compound, whereby the metal is oxidized. A radical that adds onto ethylenic groups is formed in this reaction. In this invention, a halogenating agent (e.g. N-bromosuccinimide) may be used to halogenate (e.g., brominate) the polymer backbone on the vinyl aromatic block. The carbonyl containing group may then be grafted onto the halogenated vinyl block in a controlled fashion by ATRP.

The term "vinyl aromatic carbon" is used herein to refer to the carbon atom of the vinyl group that is directly attached to the aromatic ring(s) (e.g., benzene ring(s)) of the vinyl aromatic block.

When the polymer backbone comprises SBR and the pendant carbonyl containing group is derived from one or more of maleic anhydride (MAA), one or more alkyl (meth)acrylates, one or more aryl (meth)acrylates, one or more alkyl itaconates, one or more aryl itaconates, one or more alkyl (meth)acrylamides, one or more aryl (meth)acrylamides, or a mixture of two or more thereof, the inventive grafted polymer may be referred to as an ATRP mediated grafted SBR.

An advantage of the invention is that by virtue of the ATRP process used for the carbonyl containing compound grafting step, the loading of the pendant carbonyl containing groups on the polymer backbone can be relatively high through controlled polymerization, for example, from 0.5 to 30% by weight, or from 1 to 10% by weight. This leads to higher levels of functionalization which may enhance the soot dispersancy capabilities of the inventive grafted polymer.

According to a further aspect of the invention, the invention relates to a process, comprising: grafting a carbonyl containing group on a polymer backbone to form a grafted polymer; the polymer backbone comprising at least one of block A and at least one of block B, block A comprising at least one olefin block, block B comprising at least one vinyl aromatic block, the mole ratio of block A to the combination of block A plus block B (i.e., the mole ratio of monomer units in block A to monomer units in the combination of block A plus block B) being in the range from 0.5 to 0.9; the carbonyl containing group being derived from a carboxylic acid or derivative thereof, the derivative being an anhydride, halide or alkyl ester, the carbonyl containing group being grafted on block B, the carbonyl containing group being optionally further substituted to provide ester, imide and/or amide functionality; the carbonyl containing group being grafted on block B by halogenating the vinyl aromatic carbon of block B and then grafting a carboxylic acid or derivative thereof on the vinyl aromatic carbon of block B in the presence of an activating agent.

According to a still further aspect of the inventive process, block B is halogenated by contacting block B with a halogen containing compound to form a reaction mixture and radiating the reaction mixture.

According to a still further aspect of the inventive process, the halogen containing compound comprises a bromine containing compound, a chlorine containing compound, or a mixture thereof.

According to a still further aspect of the inventive process, the activating agent comprises copper (I) bromide and propylpyridin-2-ylmethylene amine.

According to a still further aspect of the inventive process, the polymer comprises repeat units derived from an aliphatic diene and repeat units derived from an alkylene arene.

According to a still further aspect of the inventive process, the polymer comprises a backbone comprising repeat units derived from styrene and butadiene.

According to a still further aspect of the inventive process, the carboxylic acid derivative comprises an anhydride.

According to a still further aspect of the inventive process, the anhydride comprises maleic anhydride.

According to a still further aspect of the inventive process, the grafted polymer has a weight average molecular weight in the range from 1000 to 1,000,000, or in the range from 10,000 to 250,000.

According to a still further aspect of the inventive process, the grafted polymer has a polydispersity in the range from 1 to 1.6, or in the range from 1.01 to 1.55.

According to a still further aspect of the inventive process, the grafted polymer comprises double bonds available for hydrogenation and from 50% to 100%, or 90% to 100%, or 95% to 100%, of the double bonds available for hydrogenation are hydrogenated.

According to a still further aspect of the inventive process, the imide and/or amide functionality is provided by a nitrogen containing monomer or an amine.

According to a still further aspect of the inventive process, the nitrogen containing monomer or amine comprises a primary and/or secondary nitrogen.

According to a still further aspect of the inventive process, the amine comprises Fast Violet B, Fast Blue BB, Fast Blue RR, aniline, N-alkylanilines, di-(para-methylphenyl)amine, 4-aminodiphenylamine, N,N-dimethylphenylenediamine, naphthylamine, 4-(4-nitrophenylazo)aniline, sulfamethazine, 4-phenoxyaniline, 3-nitroaniline, 4-aminoacetanilide (N-(4-aminophenyl)acetamide)), 4-amino-2-hydroxy-benzoic acid phenyl ester (phenyl amino salicylate), N-(4-aminophenyl)-benzamide, benzylamines, 4-phenylazoaniline, para-ethoxyaniline, para-dodecylaniline, cyclohexyl-substituted naphthylamine, thienyl-substituted aniline, or a mixture of two or more thereof.

According to a still further aspect of the inventive process, the amine functionality is derived from at least one of N-p-diphenylamine 1,2,3,6-tetrahydrophthalimide; 4-anilinophenyl methacrylamide; 4-anilinophenyl maleimide; 4-anilinophenyl itaconamide; acrylate and methacrylate esters of 4-hydroxydiphenylamine; the reaction product of p-aminodiphenylamine or p-alkylaminodiphenylamine with glycidyl methacrylate; the reaction product of p-aminodiphenylamine with isobutyraldehyde, derivatives of p-hydroxydiphenylamine; derivatives of phenothiazine; vinyl-containing derivatives of diphenylamine; or a mixture of two or more thereof.

According to a still further aspect of the inventive process, the amine comprises aminodiphenyl amine, dimethylaminopropyl amine, aminopropylimidazole, dimethylphenyl amine, 4-(4-nitrophenyl azo) aniline, Fast Blue RR, or a mixture of two or more thereof.

DETAILED DESCRIPTION

All ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character.

Examples of hydrocarbyl groups include:

(i) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

(ii) substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulphoxy);

(iii) hetero substituents, that is, substituents which, while having a predominantly hydrocarbon character, in the context of this invention, contain other than carbon in a ring or chain otherwise composed of carbon atoms. Heteroatoms include sulphur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

Unless otherwise indicated, molecular weights are determined by gel permeation chromatography using polystyrene standards.

The term "branched alkyl groups" includes branched alkyl groups that are optionally further substituted. As otherwise stated, alkyl branches on the polymer chain may or may not themselves be further branched.

It is known that some of the materials described herein may interact in the final formulation, so that the components of the final formulation may be different from those that are initially added. The products formed thereby, including the products formed upon employing the composition of the present invention in its intended use, may not be susceptible of easy description. Nevertheless, all such modifications and reaction products are included within the scope of the present invention; the present invention encompasses compositions prepared by admixing the components described herein.

Each of the documents referred to herein is incorporated herein by reference. Except in the Examples, or where otherwise explicitly indicated, all numerical quantities in this description or in the appended claims specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

Grafted Polymer

The grafted polymer comprises a polymer backbone and a pendant carbonyl containing group grafted on the polymer backbone. The grafted polymer may comprise block A and block B. These may be represented by the formulae:

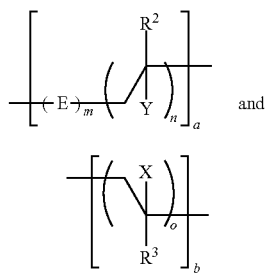

Block (A) and Block (B)

wherein a and b are coefficients for their corresponding monomer repeat units, wherein the ratio of a/(a+b) may be 0.5 to 0.9, or 0.55 to 0.8, or 0.6 to 0.75;

$R^2$ is H or alkyl, with the proviso that 5 mol % to 95 mol % of the $R^2$ groups may be alkyl groups (in one embodiment, $R^2$ is not H);

$R^3$ is an arene group or an alkyl-substituted arene group;

E is an alkylene group or an alkenylene group (typically E is a $C_4$ group);

X is the pendant carbonyl-containing group;

Y is hydrogen or an alkyl group; and m, n, and o are numbers of repeat units for the moieties described above, with the proviso that each repeat unit is present in sufficient quantities to provide the polymer with an appropriate number average molecular weight, and wherein the polymer is terminated with a polymerisation terminating group, and with the proviso that when the copolymer comprises a tapered copolymer block, A contains repeat units with greater than 38.5 mol % to 95 mol % of branched, optionally substituted alkyl groups (that is, alkyl branching groups).

The grafted polymer may be represented by the formula:

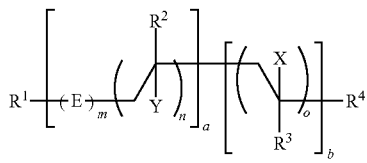

wherein a and b are coefficients for their corresponding monomer repeat units, wherein the ratio of a/(a+b) may be 0.5 to 0.9, or 0.55 to 0.8, or 0.6 to 0.75;

$R^1$ is H, t-alkyl, sec-alkyl, $CH_3$—, $R'_2N$—, or aryl;

$R^2$ is H or alkyl with the proviso that in block (A) 5 mol % to 95 mol % of the $R^2$ groups may be alkyl groups;

$R^3$ is an arene group or an alkyl-substituted arene group;

$R^4$ is a polymerization terminating group, such as H or alkyl;

E is an alkylene group or an alkenylene group (typically E is a $C_4$ group);

X is the pendant carbonyl-containing group;

Y is hydrogen or an alkyl group;

R' is a hydrocarbyl group, and m, n, and o are numbers of repeat units for the moieties described above, with the proviso that each repeat unit is present in sufficient quantities to provide the hydrogenated copolymer with an appropriate number average molecular weight, and with the proviso that when the copolymer comprises a tapered copolymer, block A contains repeat units with greater than 38.5 mol % to 95 mol % of branched, optionally substituted alkyl groups (that is, alkyl branching groups).

The grafted polymer may be made by the process comprising:

(a) polymerizing (i) at least one vinyl aromatic block and (ii) at least one olefin block, wherein the polymer may optionally be hydrogenated at 50% to 100%, 90% to 100%, or 95% to 100%, of available double bonds (which does not include aromatic unsaturation) followed by step (b) and optionally step (c);

(b) grafting a carbonyl containing group on the polymer from step (a) by halogenating (e.g., brominating or chlorinating) one or more of the vinyl aromatic carbons of the vinyl aromatic block and then reacting the halogenated vinyl aromatic carbons with a carboxylic acid or derivative thereof (e.g., maleic anhydride, alkyl (meth)acrylate, aryl (meth)acrylate, alkyl itaconate, aryl itaconate, alkyl (meth)acrylamide, aryl (meth)acrylamide, or a mixture of two or more thereof) in the presence of an activating agent, the grafted polymer comprising a polymer backbone and one or more pendant carbonyl containing groups; and (c) optionally reacting the grafted polymer of step (b) with at least one of alcohol, amine and/or nitrogen-containing monomer to form a functionalized polymer (typically forming an ester, amide and/or an imide).

Block A may be derived from one or more aliphatic dienes, for example, butadiene. Suitable dienes used to generate the block represented by A may include 1,4-butadiene or isoprene. The diene may comprise 1,4-butadiene. In one embodiment block A may be substantially free of, or free of, isoprene.

As used herein the term "substantially free of isoprene" means the polymer contains isoprene at not more than impurity levels, typically, less than 1 mol % of the polymer, or 0.05 mol % or less of the polymer, or 0.01 mol % or less of the polymer, or 0 mol % of the polymer.

The diene may polymerize by either 1,2-addition or 1,4-addition. The degree of 1,2-addition may be defined by the relative amounts of repeat units having alkyl group branches (also defined herein as $R^2$). Any initially-formed pendant unsaturated or vinyl groups, upon hydrogenation, may become alkyl branches ("branched alkyl groups").

Block A (when not in a tapered copolymer) may contain from 20 mol % to 80 mol %, or 25 mol % to 75 mol %, or 30 mol % to 70 mol %, or 40 mol % to 65 mol % of repeat units having alkyl group branches.

A tapered copolymer, may contain 40 mol % to 80 mol %, or 50 mol % to 75 mol % of block A containing repeat units of branched alkyl groups (or vinyl groups).

Block B may be derived from one or more vinyl aromatic monomers. The vinyl aromatic monomer may be an alkylene arene. These may include styrene or alkylstyrene (e.g. alpha-methylstyrene, para-tert-butylstyrene, alpha-ethylstyrene, and para-lower alkoxy styrene). In one embodiment the vinyl aromatic monomer is styrene.

The polymer backbone may be prepared by anionic polymerization techniques. While not wishing to be bound by theory, it is believed that anionic polymerization initiators containing alkali metals and/or organometallic compounds are sensitive to interactions between the various metals and the counterion and/or solvent. In order to prepare a polymer with increasing amounts of diene polymerized with a larger amount of 1,2-addition, it is typical to employ a polar solvent, for example, tetrahydrofuran (THF). Further employing an initiator with a lower atomic mass is suitable (for example use lithium rather than cesium). In different embodiments butyl lithium or butyl sodium may be used as initiators. Typical anionic polymerization temperatures such as below 0° C., or −20° C. or less may be employed. A more detailed description of methods suitable for preparing a polymer with a greater amounts of diene 1,2-addition stereospecificity is found in Kirk-Othmer Encyclopedia of Chemical Technology, Third Edition, Volume 4, pages 316-317 or in Anionic Polymerisation, Principles and Practical Applications, Edited by Henry L. Hsieh and Roderic P. Quirk, pages 209 and 217, 1996, Marcel Dekker.

The olefin block may be formed with a large amount of 1,2-addition (for example, 5 mol % to 95 mol % of branched groups) by employing the processes or methods described in U.S. Pat. No. 5,753,778 (discloses in column 3, lines 1 to 33 a process using an alkyllithium initiator for selectively hydrogenating a polymer); U.S. Pat. No. 5,910,566 (discloses in column 3, lines 13 to 43 a suitable process, solvent and catalyst for hydrogenating a conjugated diene); U.S. Pat. No. 5,994,477 (discloses in column 3, line 24 to column 4, line 32 a method for selectively hydrogenating a polymer); U.S. Pat. No. 6,020,439 (column 3, lines 30-52 discloses a suitable catalyst); and U.S. Pat. No. 6,040,390 (discloses in column 9, lines 2-17 a suitable catalyst). Typically the amount of 1,2-addition disclosed in the Examples of these patents range from 30 to 42% of the butadiene units).

The polymer backbone may be derived from styrene and butadiene with 5 mol % to 95 mol % of butadiene. An example of such a material is Lubrizol®7408A which is an SBR with a number average molecular weight of 120,000 and a styrene content of 30% by weight.

The polymer backbone may be derived from one of the SBRs available from Dynasol under the names Dyne 623-14 or Dyne 623-18. Dyne 623-14 has a number average molecular weight of 130,000 and a styrene content of 30% by weight. Dyne 623-18 has a number average molecular weight of 90,000 and a styrene content of 30% by weight.

The grafting of the carbonyl containing group on the polymer backbone may involve halogenating (e.g., brominating or chlorinating) one or more of the vinyl aromatic carbons of the polymer backbone and then reacting the halogenated vinyl aromatic carbons with a carboxylic acid or derivative thereof in the presence of an activating agent. The carboxylic acid derivatives may include maleic anhydride, alkyl (meth)acrylate, aryl (meth)acrylate, alkyl itaconate, aryl itaconate, alkyl (meth)acrylamide, aryl (meth)acrylamide, or a mixture of two or more thereof. The halogenation (e.g., bromination or chlorination) of the vinyl aromatic carbons of the polymer backbone may be conducted by mixing the polymer with a halogen (e.g., bromine or chlorine) containing compound in a solvent to form a reaction mixture and then subjecting the reaction mixture to heat (optionally with an activating agent such as radical initiator), radiation or sonication for an effective period of time to attach the halogen (e.g., bromine or chlorine) atoms to vinyl aromatic carbons of the polymer backbone. The halogen containing compound may be a bromine containing compound, or a chlorine containing compound. Examples of the bromine containing compounds that may be used may include N-bromosuccinimide (NBS). Examples of the chlorine containing compounds that may be used may include N-chlorosuccinimide (NCS), chlorine, Chloramine T (N-chloro tosylamide sodium salt), or tert-butyl hypochlorite. Examples of the solvent that may be used may include acetonitrile, dichloromethane, chloroform, or carbon tetrachloride. The radiation or light may be provided by an suitable source, for example, a heat lamp. The temperature of the reaction mixture during the halogenating step may be the range from 10° C. to 100° C., or from 30° C. to 60° C. The concentration of the polymer in the solvent during the halogenating step may be in the range from 10 to 500 grams per kilogram (g/kg), or from 100 to 250 g/kg. The concentration of the halogen containing compound in the solvent may be in the range from 1 to 100 g/kg, or from 5 to 50 g/kg. The reaction mixture may be reacted until a desired number of vinyl aromatic-derived carbons have been halogenated. This process may take from about 30 minutes to several hours. The product may be referred to as a halogenated (e.g., brominated or chlorinated) polymer. The halogenated polymer may be separated from the solvent using conventional techniques such as precipitation in isopropanol followed by drying. The reaction may be represented, for example, by the following equation. In the following equation $R_1$ may be H or an alkyl group of 1 to 10 carbon atoms, or 1 to 4 carbon atoms.

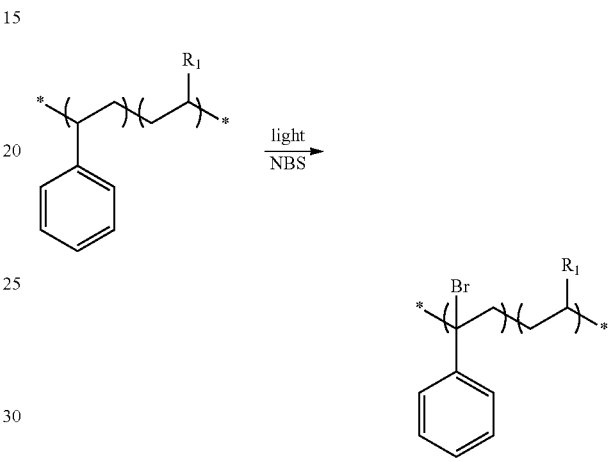

The halogenated polymer may be reacted with a carboxylic acid or derivative thereof to form the grafted polymer. The reaction may be conducted in a solvent in the presence of an activating agent. The activating agent may comprise copper (I) bromide in combination with a ligand such as propylpyridin-2-ylmethylene-amine. Other activating agents that may be used may include compounds containing Fe, Rh, Ru, Mn, Ni, or Pd. Other ligands that may be used may include generic structures as shown

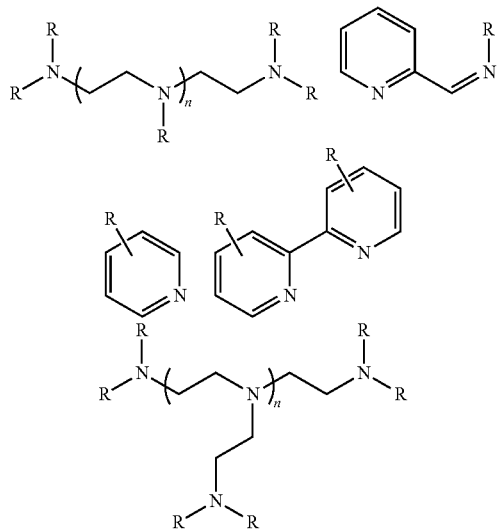

wherein R may be H, $C_1$-$C_{12}$ alkyl or $C_1$-$C_4$ alkyl groups; n may be 0 to 4, or 0 to 2. Specific examples may include 2,2'-bipyridine; 3-butylpyridine; N1-(2-(dimethylamino)ethyl)-N1,N2,N2-trimethylethane-1,2-diamine; and N1,N1-bis(2-(dimethylamino)ethyl)-N2,N2-dimethylethane-1,2-diamine, or a mixture of two or more thereof.

The solvent may include toluene, N,N-dimethylformamide (DMF), N,N-dimethylacetamide, acetonitrile, benzene, or a mixture of two or more thereof.

The carboxylic acid derivatives may include anhydrides, acyl halides, lower alkyl (i.e., up to 7 carbon atoms) esters thereof, amides, imides, or mixtures of two or more thereof. These may include monocarboxylic acids (e.g., acrylic acid and methacrylic acid) and esters, e.g., lower alkyl esters thereof, as well as dicarboxylic acids, anhydrides and esters, e.g., lower alkyl esters thereof. Examples of dicarboxylic acids, anhydrides and esters may include maleic acid or anhydride, fumaric acid, or ester, such as lower alkyl, i.e., those containing no more than 7 carbon atoms on the alkyl ester group.

The dicarboxylic acids, anhydrides and esters may be represented by the groups of formulae:

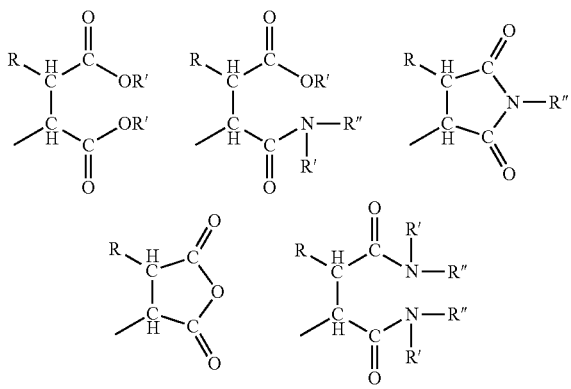

In these formulae, R may hydrogen or hydrocarbyl of up to 8 carbon atoms, such as alkyl, alkaryl or aryl. Each R' may be independently hydrogen or hydrocarbyl, for instance, lower alkyl of up to 7 carbon atoms (e.g., methyl, ethyl, butyl or heptyl). R" may be independently aromatic (mononuclear or fused polynuclear) hydrocarbon, representative of an aromatic amine or polyamine as described below. The dicarboxylic acids, anhydrides or alkyl esters thereof typically contain up to 25 carbon atoms total, or up to 15 carbon atoms. Examples may include maleic acid or anhydride, or succinimide derivatives thereof; benzyl maleic anhydride; chloro maleic anhydride; heptyl maleate; itaconic acid or anhydride; citraconic acid or anhydride; ethyl fumarate; fumaric acid; mesaconic acid; ethyl isopropyl maleate; isopropyl fumarate; hexyl methyl maleate; and phenyl maleic anhydride. These derivatives may include maleic anhydride, alkyl (meth)acrylate, aryl (meth)acrylate, alkyl itaconate, aryl itaconate, alkyl (meth)acrylamide, aryl (meth)acrylamide, or a mixture of two or more thereof. Maleic anhydride (MAA), maleic acid and fumaric acid and the lower alkyl esters thereof are often used.

The concentration of the halogenated polymer in the solvent during the grafting step may be in the range from 1 to 70% by weight, or from 10 to 50% by weight. The concentration of the carboxylic acid or derivative thereof in the solvent may be in the range from 0.1 to 20% by weight, or from 0.5 to 10% by weight. The concentration of the halogen containing compound (e.g., copper (I) bromide) in the solvent may be in the range from 0.01 to 10% by weight, or from 0.2 to 5% by weight. The concentration of the ligand in the solvent may be in the range from 0.01 to 10% by weight, or from 0.2 to 5% by weight. The reaction temperature may be in the range from 50° C. to 200° C., or from 90° C. to 150° C. The reaction may be conducted until a desired level of loading of the carbonyl containing group on the polymer backbone is achieved. The loading of the carbonyl containing group on the polymer backbone may be from 0.5 to 20% by weight, or from 1 to 5% by weight. The polymer may be separated from the solvent using conventional techniques such as precipitation followed by drying.

The grafting of the carbonyl containing group on the polymer backbone may be represented by the following reaction equation:

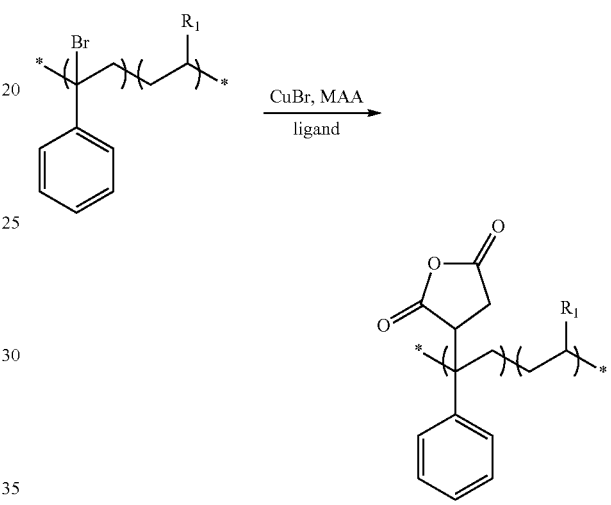

The weight average molecular weight of the grafted polymer may be in the range from 1000 to 1,000,000, or 5,000 to 500,000, or 10,000 to 250,000, or 50,000 to 175,000.

The polydispersity of the grafted polymer may be in the range from 1 to 1.6, or 1.01 to 1.55, or 1 to 1.4, or 1.01 to 1.2.

The grafted polymer may comprise a backbone derived from 5 to 70 mol %, or 10 mol % to 60 mol %, or 20 mol % to 60 mol % of the alkenyl arene monomer e.g., styrene.

The grafted polymer may comprise a backbone derived from 30 to 95 mol %, or 40 mol % to 90 mol %, or 40 mol % to 80 mol % of an olefin monomer, typically a diene, e.g., butadiene.

The grafted polymer may be a block copolymer and may include regular, random, tapered or alternating architectures. The block copolymer may be either a di-block AB copolymer, or a tri-block ABA copolymer. Often the polymer is a di-block AB copolymer. In one embodiment the polymer is other than a tapered copolymer.

The grafted polymer may be a sequential block, random block or regular block copolymer. In one embodiment the grafted polymer is sequential block copolymer.

As used herein the term "sequential block copolymer" means that the copolymer consists of discrete blocks (A and B), each made up of a single monomer. Examples include of a sequential block copolymer include those with A-B or B-A-B architecture.

The grafted polymer may be a linear or a branched copolymer.

The grafted polymer may be a diblock sequential block copolymer, or a diblock normal diblock copolymer.

In one embodiment the grafted polymer is not a triblock or higher block copolymer.

Alcohol-Functionalized Polymer

In one embodiment the grafted polymer of the invention further comprises an ester group, typically from the reaction of the carbonyl-containing functional group with an alcohol under ester forming conditions known in the art. Suitable alcohols may contain 1 to 40, or 6 to 30 carbon atoms.

Examples of suitable alcohols include Oxo Alcohol® 7911, Oxo Alcohol® 7900 and Oxo Alcohol® 1100 of Monsanto; Alphanol® 79 of ICI; Nafol® 1620, Alfol® 610 and Alfol® 810 of Condea (now Sasol); Epal® 610 and Epal® 810 of Ethyl Corporation; Linevol® 79, Linevol® 911 and Dobanol® 25 L of Shell AG; Lial® 125 of Condea Augusta, Milan; Dehydad® and Lorol® of Henkel KGaA (now Cognis) as well as Linopol® 7-11 and Acropol® 91 of Ugine Kuhlmann.

Amine-Functionalized Polymer

The grafted polymer of the invention may further comprise a nitrogen-containing group. The carbonyl containing group of the grafted polymer may be reacted with a nitrogen-containing monomer or an amine under amide and/or imide forming conditions known in the art to form an amine functionalized polymer containing an amide and/or imide group. The nitrogen-containing monomer or amine may contain a primary and/or secondary nitrogen.

Examples of suitable nitrogen-containing monomers may include (meth)acrylamide or a nitrogen containing (meth) acrylate monomer (where "(meth)acrylate" or "(meth)acrylamide" represents both the acrylic or methacrylic materials). Typically the nitrogen-containing compound comprises a (meth)acrylamide or nitrogen containing (meth)acrylate monomer and may be represented by the formula:

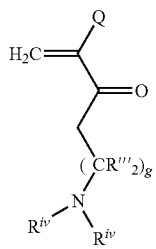

wherein

Q is hydrogen or methyl and, in one embodiment, Q is methyl;

Z is an N—H group or O (oxygen);

each R''' is independently hydrogen or a hydrocarbyl group containing 1 to 2 carbon atoms and, in one embodiment, each R''' is hydrogen;

each $R^{iv}$ is independently hydrogen or a hydrocarbyl group containing 1 to 8 or 1 to 4 carbon atoms; and g is an integer from 1 to 6 and, in one embodiment, g is 1 to 3.

Examples of suitable nitrogen-containing monomers include N,N-dimethylacrylamide, N-vinyl carbonamides (such as, N-vinyl-formamide, N-vinylacetoamide, N-vinyl-n-propionamides, N-vinyl-1-propionamides, N-vinyl hydroxyacetoamide, vinyl pyridine, N-vinyl imidazole, N-vinyl pyrrolidinone, N-vinyl caprolactam, dimethylaminoethyl acrylate, dimethylaminoethyl methacrylate, dimethylaminobutylacrylamide, dimethylamine propyl methacrylate, dimethylaminopropylacrylamide, dimethylaminopropylmethacrylamide, dimethylaminoethylacrylamide or mixtures thereof.

The amine may be aromatic. Aromatic amines include those which can be represented by the general structure NH$_2$—Ar or T-NH—Ar, where T may be an alkyl or aromatic group, Ar is an aromatic group, including nitrogen-containing aromatic groups and Ar groups including any of the following structures:

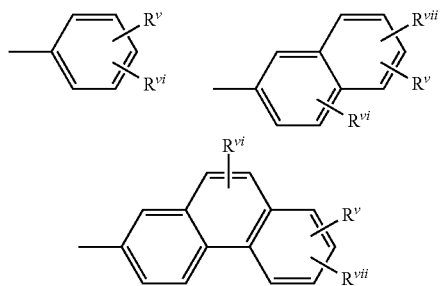

as well as multiple non-condensed or linked aromatic rings. In these and related structures, $R^v$, $R^{vi}$, and $R^{vii}$ can be independently, among other groups disclosed herein, —H, —C$_{1-18}$ alkyl groups, nitro groups, —NH—Ar, —N=N—Ar, —NH—CO—Ar, —OOC—Ar, —OOC—C$_{1-18}$ alkyl, —COO—C$_{1-18}$ alkyl, —OH, —O—(CH$_2$CH$_2$—O)$_n$C$_{1-18}$ alkyl groups, and —O—(CH$_2$CH$_2$O)$_n$Ar (where n is 0 to 10).

Aromatic amines include those amines wherein a carbon atom of the aromatic ring structure is attached directly to the amino nitrogen. The amines may be monoamines or polyamines. The aromatic ring will typically be a mononuclear aromatic ring (i.e., one derived from benzene) but can include fused aromatic rings, especially those derived from naphthalene. Examples of aromatic amines include aniline, N-alkylanilines such as N-methylaniline and N-butylaniline, di-(para-methylphenyl)amine, 4-aminodiphenylamine, N,N-dimethylphenylene-diamine, naphthylamine, 4-(4-nitrophenylazo)aniline (disperse orange 3), sulfamethazine, 4-phenoxyaniline, 3-nitroaniline, 4-aminoacetanilide (N-(4-aminophenyl)acetamide)), 4-amino-2-hydroxy-benzoic acid phenyl ester (phenyl amino salicylate), N-(4-amino-phenyl)-benzamide, various benzylamines such as 2,5-dimethoxybenzylamine, 4-phenylazoaniline, and substituted versions of these. Other examples include para-ethoxyaniline, para-dodecylaniline, cyclohexyl-substituted naphthylamine, and thienyl-substituted aniline. Examples of other suitable aromatic amines include amino-substituted aromatic compounds and amines in which the amine nitrogen is a part of an aromatic ring, such as 3-aminoquinoline, 5-aminoquinoline, and 8-aminoquinoline. Also included are aromatic amines such as 2-aminobenzimidazole, which contains one secondary amino group attached directly to the aromatic ring and a primary amino group attached to the imidazole ring. Other amines include N-(4-anilinophenyl)-3-aminobutanamide or 3-amino propyl imidazole. Yet other amines include 2,5-dimethoxybenzylamine.

Additional aromatic amines and related compounds are disclosed in U.S. Pat. Nos. 6,107,257 and 6,107,258; some of these include aminocarbazoles, benzoimidazoles, aminoindoles, aminopyrroles, amino-indazolinones, mercaptotriazoles, aminophenothiazines, aminopyridines, aminopyrazines, aminopyrimidines, pyridines, pyrazines, pyrimidines, aminothiadiazoles, aminothiothiadiazoles, and aminobenzotriaozles. Other suitable amines include 3-amino-N-(4-anilinophenyl)-N-isopropyl butanamide, and N-(4-anilinophenyl)-3-{(3-aminopropyl)-(cocoalkyl)-amino}butanamide. Other aromatic amines which can be used include various aromatic amine dye intermediates containing multiple aromatic rings linked by, for example, amide structures. Examples include materials of the general structure

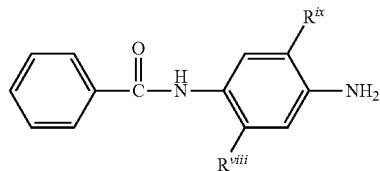

and isomeric variations thereof, where $R^{viii}$ and $R^{ix}$ are independently alkyl or alkoxy groups such as methyl, methoxy, or ethoxy. In one instance, $R^{viii}$ and $R^{ix}$ are both —$OCH_3$ and the material is known as Fast Blue RR [CAS#6268-05-9].

In another instance, $R^{ix}$ is —$OCH_3$ and $R^{viii}$ is —$CH_3$, and the material is known as Fast Violet B [99-21-8]. When both $R^{viii}$ and $R^{ix}$ are ethoxy, the material is Fast Blue BB [120-00-3]. U.S. Pat. No. 5,744,429 discloses other aromatic amine compounds, particularly aminoalkylphenothiazines. N-aromatic substituted acid amide compounds, such as those disclosed in U.S. Patent application 2003/0030033 A1, may also be used for the purposes of this invention. Suitable aromatic amines include those in which the amine nitrogen is a substituent on an aromatic carboxyclic compound, that is, the nitrogen is not $sp^2$ hybridized within an aromatic ring.

The aromatic amine may have an N—H group capable of condensing with the pendant carbonyl containing group. Certain aromatic amines are commonly used as antioxidants. Of particular importance in that regard are alkylated diphenylamines such as nonyldiphenylamine and dinonyldiphenylamine. To the extent that these materials will condense with the carboxylic functionality of the polymer chain, they are also suitable for use within the present invention. However, it is believed that the two aromatic groups attached to the amine nitrogen may lead to steric hindrance and reduced reactivity. Thus, suitable amines include those having a primary nitrogen atom (—$NH_2$) or a secondary nitrogen atom in which one of the hydrocarbyl substituents is a relatively short chain alkyl group, e.g., methyl. Among such aromatic amines are 4-phenylazoaniline, 4-aminodiphenylamine, 2-aminobenzimidazole, and N,N-dimethylphenylenediamine. Some of these and other aromatic amines may also impart antioxidant performance to the polymers, in addition to dispersancy and other properties.

In one embodiment of the invention, the amine component of the reaction product further comprises an amine having at least two N—H groups capable of condensing with the carboxylic functionality of the polymer. This material is referred to hereinafter as a "linking amine" as it can be employed to link together two of the polymers containing the carboxylic acid functionality. It has been observed that higher molecular weight materials may provide improved performance, and this is one method to increase the material's molecular weight. The linking amine can be either an aliphatic amine or an aromatic amine; if it is an aromatic amine, it is considered to be in addition to and a distinct element from the aromatic amine described above, which typically will have only one condensable or reactive NH group, in order to avoid excessive crosslinking of the polymer chains. Examples of such linking amines include ethylenediamine, phenylenediamine, and 2,4-diaminotoluene; others include propylenediamine, hexamethylenediamine, and other, ω-polymethylenediamines. The amount of reactive functionality on such a linking amine can be reduced, if desired, by reaction with less than a stoichiometric amount of a blocking material such as a hydrocarbyl-substituted succinic anhydride.

In one embodiment the amine comprises nitrogen-containing compounds capable of reacting directly with a polymer backbone. Examples of suitable amines include N-p-diphenylamine 1,2,3,6-tetrahydrophthalimide, 4-anilinophenyl methacrylamide, 4-anilinophenyl maleimide, 4-anilinophenyl itaconamide, acrylate and methacrylate esters of 4-hydroxydiphenylamine, the reaction product of p-aminodiphenylamine or p-alkylaminodiphenylamine with glycidyl methacrylate, the reaction product of p-aminodiphenylamine with isobutyraldehyde, derivatives of p-hydroxydiphenylamine; derivatives of phenothiazine, vinylogous derivatives of diphenylamine, or mixtures thereof.

The amine may comprise aminodiphenyl amine (ADPA), dimethylaminopropyl amine, aminopropylimidazole, dimethylphenyl amine, 4-(4-nitrophenyl azo) aniline, Fast Blue RR, or a mixture of two or more thereof.

The reaction to functionalize the grafted polymer with an amine may be represented by the following equation:

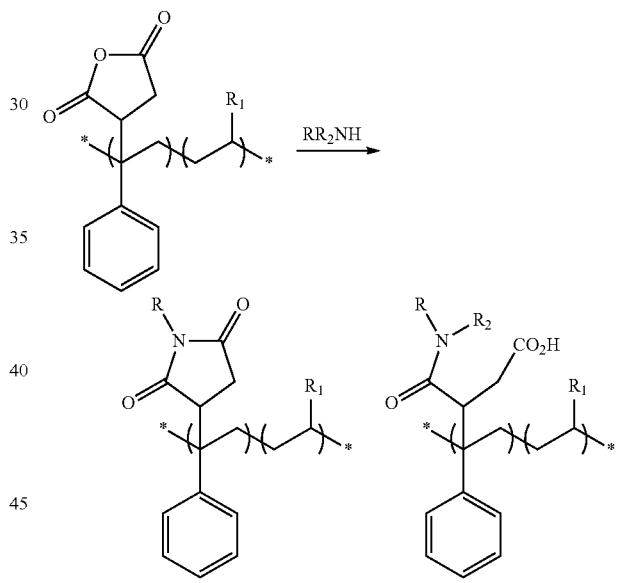

Concentrates and Lubricating Compositions

The grafted polymer may be provided in concentrate form. The concentrate may comprise the grafted polymer and a diluent. The diluent may be any of the oils discussed below. The grafted polymer may be used in a fully formulated lubricant composition. If the grafted polymer of the present invention is in the form of a concentrate (which may be combined with additional oil to form, in whole or in part, a fully formulated lubricant), the ratio of the grafted polymer to the diluent may be from 1:99 to 99:1 by weight, or from 80:20 to 10:90 by weight.

The fully formulated lubricating composition may comprise a major amount of an oil of lubricating viscosity, and a minor dispersant viscosity modifying amount of the grafted polymer. The concentration of the grafted polymer in the lubricating composition may be in the range from 100 to 100,000 parts per million (ppm), or from 5000 to 15,000 ppm, or from 7000 to 9000 ppm, or 8000 ppm.

The concentrates and lubricating compositions may optionally comprises other performance additives. The other performance additives may comprise at least one of metal deactivators, conventional detergents (detergents prepared by processes known in the art), dispersants, viscosity modifiers, friction modifiers, antiwear agents, corrosion inhibitors, dispersant viscosity modifiers, extreme pressure agents, antiscuffing agents, antioxidants, foam inhibitors, demulsifiers, pour point depressants, seal swelling agents and mixtures thereof. Typically, fully-formulated lubricating oil will contain one or more of these performance additives.

The Oil of Lubricating Viscosity

The oil of lubricating viscosity may be a natural and/or synthetic oil. The oil may comprise a hydrocracked, hydrogenated, hydrotreated, unrefined, refined, or re-refined oil, or a mixture of two or more thereof.

Unrefined oils are those obtained directly from a natural or synthetic source generally without (or with little) further purification treatment.

Refined oils are similar to the unrefined oils except they have been further treated in one or more purification steps to improve one or more properties. Purification techniques are known in the art and include solvent extraction, secondary distillation, acid or base extraction, filtration, percolation and the like.

Re-refined oils are also known as reclaimed or reprocessed oils, and are obtained by processes similar to those used to obtain refined oils and often are additionally processed by techniques directed to removal of spent additives and oil breakdown products.

The natural oils may include animal oils, vegetable oils (e.g., castor oil, lard oil), mineral lubricating oils such as liquid petroleum oils and solvent-treated or acid-treated mineral lubricating oils of the paraffinic, naphthenic or mixed paraffinic-naphthenic types and oils derived from coal or shale or mixtures thereof.

The synthetic oils may include hydrocarbon oils such as polymerized and interpolymerized olefins (e.g., polybutylenes, polypropylenes, propyleneisobutylene copolymers); poly(1-hexenes), poly(1-octenes), poly(1-decenes), and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); alkylated diphenyl ethers and alkylated diphenyl sulphides and the derivatives, analogs and homologs thereof or mixtures thereof.

Other synthetic oils that may be used may include liquid esters of phosphorus-containing acids (e.g., tricresyl phosphate, trioctyl phosphate, and the diethyl ester of decane phosphonic acid), and polymeric tetrahydrofurans. Synthetic oils may be produced by Fischer-Tropsch reactions and typically may be hydroisomerised Fischer-Tropsch hydrocarbons or waxes. In one embodiment oils may be prepared by a Fischer-Tropsch gas-to-liquid synthetic procedure as well as other gas-to-liquid oils.

The oil may comprise one or more oils as specified in the American Petroleum Institute (API) Base Oil Interchangeability Guidelines. The five base oil groups are as follows: Group I (sulphur content >0.03 wt %, and/or <90 wt % saturates, viscosity index 80-120); Group II (sulphur content ≤0.03 wt %, and ≥90 wt % saturates, viscosity index 80-120); Group III (sulphur content ≤0.03 wt %, and ≥90 wt % saturates, viscosity index ≥120); Group IV (all polyalphaolefins (PAOs)); and Group V (all others not included in Groups I, II, III, or IV). The oil of lubricating viscosity comprises an API Group I, Group II, Group III, Group IV, Group V oil or mixtures thereof. Often the oil of lubricating viscosity is an API Group I, Group II, Group III, Group IV oil or mixtures thereof. Alternatively the oil of lubricating viscosity is often an API Group I, Group II, Group III oil or mixtures thereof. In one embodiment the oil is a Group III oil.

Dispersants

Dispersants are often known as ashless-type or ashless dispersants because, prior to mixing in a lubricating oil composition, they do not contain ash-forming metals and they do not normally contribute any ash forming metals when added to a lubricant and polymeric dispersants. Ashless type dispersants are characterized by a polar group attached to a relatively high molecular weight hydrocarbon chain. Typical ashless dispersants include N-substituted long chain alkenyl succinimides. Examples of N-substituted long chain alkenyl succinimides include polyisobutylene succinimide with number average molecular weight of the polyisobutylene substituent in the range 350 to 5000, or 500 to 3000. Succinimide dispersants and their preparation are disclosed, for instance in U.S. Pat. No. 4,234,435. Succinimide dispersants are typically the imide formed from a polyamine, typically a polyethylene polyamine.

In one embodiment the invention further comprises at least one dispersant derived from polyisobutylene succinimide with number average molecular weight of the polyisobutylene component in the range 350 to 5000, or 500 to 3000. The polyisobutylene succinimide may be used alone or in combination with other dispersants.

In one embodiment the invention further comprises at least one dispersant derived from polyisobutylene, an amine and zinc oxide to form a polyisobutylene succinimide complex with zinc. The polyisobutylene succinimide complex with zinc may be used alone or in combination.

Another class of ashless dispersant is Mannich bases. Mannich dispersants are the reaction products of alkyl phenols with aldehydes (especially formaldehyde) and amines (especially polyalkylene polyamines). The alkyl group typically contains at least 30 carbon atoms.

The dispersants may also be post-treated by conventional methods by a reaction with any of a variety of agents. Among these are boron, urea, thiourea, dimercaptothiadiazoles, carbon disulphide, aldehydes, ketones, carboxylic acids, hydrocarbon-substituted succinic anhydrides, maleic anhydride, nitriles, epoxides, phosphorus compounds and/or metal compounds.

The dispersant may be present at 0 wt % to 20 wt %, or 0.1 wt % to 15 wt %, or 0.1 wt % to 10 wt %, or 1 wt % to 6 wt %, or 7 wt % to 12 wt % of the lubricating composition.

Detergents

The lubricant composition optionally further comprises other known neutral or overbased detergents. Suitable detergent substrates include phenates, sulphur containing phenates, sulphonates, salixarates, salicylates, carboxylic acids, phosphorus acids, mono- and/or di-thiophosphoric acids, alkyl phenols, sulphur coupled alkyl phenol compounds, or saligenins. Various overbased detergents and their methods of preparation are described in greater detail in numerous patent publications, including WO2004/096957 and references cited therein.

The detergent may be present at 0 wt % to 10 wt %, or 0.1 wt % to 8 wt %, or 1 wt % to 4 wt %, or greater than 4 to 8 wt %.

Antioxidants

Antioxidant compounds are known and include for example, sulphurised olefins, diphenylamines, hindered phenols, molybdenum compounds (such as molybdenum dithiocarbamates), and mixtures thereof. Antioxidant compounds may be used alone or in combination. The antioxidant may be present in ranges 0 wt % to 20 wt %, or 0.1 wt % to 10 wt %, or 1 wt % to 5 wt %, of the lubricating composition.

Aromatic amine antioxidants include those of the formula

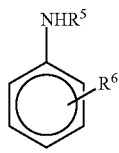

wherein $R^5$ can be an aromatic group such as a phenyl group, a naphthyl group, or a phenyl group substituted by $R^7$, and $R^6$ and $R^7$ can be independently a hydrogen or an alkyl group containing 1 to 24 or 4 to 20 or 6 to 12 carbon atoms. In one embodiment, an aromatic amine antioxidant can comprise an alkylated diphenylamine such as nonylated diphenylamine of the formula

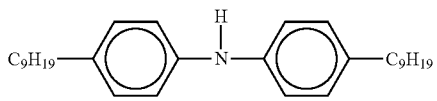

or a mixture of a di-nonylated and a mono-nonylated diphenylamine.

The hindered phenol antioxidant often contains a secondary butyl and/or a tertiary butyl group as a sterically hindering group. The phenol group is often further substituted with a hydrocarbyl group and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butyl phenol, 4-propyl-2,6-di-tert-butyl phenol or 4-butyl-2,6-di-tert-butylphenol, or 4-dodecyl-2,6-di-tert-butylphenol. In one embodiment the hindered phenol antioxidant is an ester and may include, e.g., Irganox™ L-135 from Ciba. A more detailed description of suitable ester-containing hindered phenol antioxidant chemistry is found in U.S. Pat. No. 6,559,105.

Suitable examples of molybdenum dithiocarbamates which may be used as an antioxidant include commercial materials sold under the trade names such as Molyvan 822™ and Molyvan™ A from R. T. Vanderbilt Co., Ltd., and Adeka Sakura-Lube™ S-100, S-165 and S-600 from Asahi Denka Kogyo K. K and mixtures thereof.

Viscosity Modifiers

Although the grafted polymers of the present invention may serve as dispersant viscosity modifiers, additional viscosity modifiers of other types may also be present. These viscosity modifiers are well known materials and include hydrogenated styrene-butadiene resins, ethylene-propylene copolymers, hydrogenated styrene-isoprene polymers, hydrogenated radical isoprene polymers, poly(meth)acrylates (often polyalkyl-methacrylates), polyalkyl styrenes, polyolefins and esters of maleic anhydride-styrene copolymers, or mixtures thereof. Such additional viscosity modifiers may be present in ranges including 0 wt % to 15 wt %, or 0.1 wt % to 10 wt % or 1 wt % to 5 wt % of the lubricating composition.

Antiwear Agents

The lubricant composition optionally further comprises at least one other antiwear agent. The antiwear agent may be present in ranges including 0 wt % to 15 wt %, or 0.1 wt % to 10 wt % or 1 wt % to 8 wt % of the lubricating composition.

Examples of suitable antiwear agents include phosphate esters, sulphurised olefins, sulphur-containing ashless antiwear additives are metal dihydrocarbyldithiophosphates (such as zinc dialkyldithiophosphates), thiocarbamate-containing compounds, such as thiocarbamate esters, thiocarbamate amides, thiocarbamic ethers, alkylene-coupled thiocarbamates, and bis(S-alkyldithiocarbamyl)disulphides.

The dithiocarbamate-containing compounds may be prepared by reacting a dithiocarbamate acid or salt with an unsaturated compound. The dithiocarbamate containing compounds may also be prepared by simultaneously reacting an amine, carbon disulphide and an unsaturated compound. Generally, the reaction occurs at a temperature of 25° C. to 125° C. U.S. Pat. Nos. 4,758,362 and 4,997,969 describe dithiocarbamate compounds and methods of making them.

Examples of suitable olefins that may be sulphurised to form an the sulphurised olefin include propylene, butylene, isobutylene, pentene, hexane, heptene, octane, nonene, decene, undecene, dodecene, undecyl, tridecene, tetradecene, pentadecene, hexadecene, heptadecene, octadecene, octadecenene, nonodecene, eicosene or mixtures thereof. In one embodiment, hexadecene, heptadecene, octadecene, octadecenene, nonodecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulphurised olefin includes sulphurised fatty acids and their esters. The fatty acids are often obtained from vegetable oil or animal oil; and typically contain 4 to 22 carbon atoms. Examples of suitable fatty acids and their esters include triglycerides, oleic acid, linoleic acid, palmitoleic acid or mixtures thereof. Often, the fatty acids are obtained from lard oil, tall oil, peanut oil, soybean oil, cottonseed oil, sunflower seed oil or mixtures thereof. In one embodiment fatty acids and/or ester are mixed with olefins.

In an alternative embodiment, the ashless antiwear agent may be a monoester of a polyol and an aliphatic carboxylic acid, often an acid containing 12 to 24 carbon atoms. Often the monoester of a polyol and an aliphatic carboxylic acid is in the form of a mixture with a sunflower oil or the like, which may be present in the friction modifier mixture include 5 to 95, or in other embodiments 10 to 90, or 20 to 85, or 20 to 80 weight percent of said mixture. The aliphatic carboxylic acids (especially a monocarboxylic acid) which form the esters are those acids typically containing 12 to 24 or 14 to 20 carbon atoms. Examples of carboxylic acids include dodecanoic acid, stearic acid, lauric acid, behenic acid, and oleic acid.

Polyols include diols, triols, and alcohols with higher numbers of alcoholic OH groups. Polyhydric alcohols include ethylene glycols, including di-, tri- and tetraethylene glycols; propylene glycols, including di-, tri- and tetrapropylene glycols; glycerol; butane diol; hexane diol; sorbitol; arabitol; mannitol; sucrose; fructose; glucose; cyclohexane diol; erythritol; and pentaerythritols, including di- and tripentaerythritol. Often the polyol is diethylene glycol, triethylene glycol, glycerol, sorbitol, penta-erythritol or dipentaerythritol.

The commercially available monoester known as "glycerol monooleate" is believed to include 60±5 percent by weight of the chemical species glycerol monooleate, along with 35±5 percent glycerol dioleate, and less than 5 percent trioleate and oleic acid. The amounts of the monoesters, described above, are calculated based on the actual, corrected, amount of polyol monoester present in any such mixture.

Antiscuffing Agents

The lubricant composition may also contain an antiscuffing agent. Antiscuffing agent compounds are believed to decrease adhesive wear are often sulphur-containing compounds. Typically the sulphur-containing compounds include organic sulphides and polysulphides, such as dibenzyldisulphide, bis-(chlorobenzyl)disulphide, dibutyl tetrasulphide, di-tertiary butyl polysulphide, sulphurised methyl ester of oleic acid, sulphurised alkylphenol, sulphurised dipentene, sulphurised terpene, sulphurised Diels-Alder adducts, alkyl sulphenyl N,N-dialkyl dithiocarbamates, the reaction product of polyamines with polybasic acid esters, chlorobutyl esters of 2,3-dibromopropoxyisobutyric acid, acetoxymethyl esters of dialkyl dithiocarbamic acid and acyloxyalkyl ethers of xanthogenic acids and mixtures thereof.

Extreme Pressure Agents

Extreme Pressure (EP) agents that are soluble in the oil include sulphur- and chlorosulphur-containing EP agents, chlorinated hydrocarbon EP agents and phosphorus EP agents. Examples of such EP agents include chlorinated wax; organic sulphides and polysulphides such as dibenzyldisulphide, bis-(chlorobenzyl)disulphide, dibutyl tetrasulphide, sulphurised methyl ester of oleic acid, sulphurised alkylphenol, sulphurised dipentene, sulphurised terpene, and sulphurised Diels-Alder adducts; phosphosulphurised hydrocarbons such as the reaction product of phosphorus sulphide with turpentine or methyl oleate; phosphorus esters such as the dihydrocarbon and trihydrocarbon phosphites, e.g., dibutyl phosphite, diheptyl phosphite, dicyclohexyl phosphite, pentyl phenyl phosphite; dipentyl phenyl phosphite, tridecyl phosphite, distearyl phosphite and polypropylene substituted phenol phosphite; metal thiocarbamates such as zinc dioctyldithiocarbamate and barium heptylphenol diacid; the zinc salts of a phosphorodithioic acid; amine salts of alkyl and dialkylphosphoric acids, including, for example, the amine salt of the reaction product of a dialkyldithiophosphoric acid with propylene oxide and $P_2O_5$; and mixtures thereof.

Other Additives

Other performance additives such as corrosion inhibitors include those described in paragraphs 5 to 8 of U.S. application Ser. No. 05/038,319 (filed on Oct. 25, 2004 McAtee and Boyer as named inventors), octylamine octanoate, condensation products of dodecenyl succinic acid or anhydride and a fatty acid such as oleic acid with a polyamine. In one embodiment the corrosion inhibitors include the Synalox® corrosion inhibitor. The Synalox corrosion inhibitor is typically a homopolymer or copolymer of propylene oxide. The Synalox® corrosion inhibitor is described in more detail in a product brochure with Form No. 118-01453-0702 AMS, published by The Dow Chemical Company. The product brochure is entitled "SYNALOX Lubricants, High-Performance Polyglycols for Demanding Applications."

Metal deactivators including derivatives of benzotriazoles, dimercaptothiadiazole derivatives, 1,2,4-triazoles, benzimidazoles, 2-alkyldithiobenzimidazoles, or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides; and friction modifiers including fatty acid derivatives such as amines, esters, epoxides, fatty imidazolines, condensation products of carboxylic acids and polyalkylene-polyamines and amine salts of alkylphosphoric acids may also be used in the lubricant composition. Friction modifiers may be present in ranges including 0 wt % to 10 wt % or 0.1 wt % to 8 wt % or 1 wt % to 5 wt % of the lubricating composition.

INDUSTRIAL APPLICATION

The grafted polymer of the invention may be suitable for any lubricant composition. The grafted polymer may be employed as a dispersant viscosity modifier (often referred to as a DVM).

In one embodiment the grafted polymer of the invention may provide at least one of acceptable viscosity modifying performance, acceptable dispersant performance, and/or acceptable soot and sludge handling. When the grafted polymer of the invention is used in an engine oil lubricant composition, it may provide acceptable fuel economy performance and/or acceptable soot and sludge handling.

Examples of a lubricant include an engine oil for a 2-stroke or a 4-stroke internal combustion engine, a gear oil, an automatic transmission oil, a hydraulic fluid, a turbine oil, a metal working fluid or a circulating oil.

In one embodiment the internal combustion engine may be a diesel fuelled engine, a gasoline fuelled engine, a natural gas fuelled engine or a mixed gasoline/alcohol fuelled engine. In one embodiment the internal combustion engine is a diesel fuelled engine and in another embodiment a gasoline fuelled engine.

The internal combustion engine may be a 2-stroke or 4-stroke engine. Suitable internal combustion engines include marine diesel engines, aviation piston engines, low-load diesel engines, and automobile and truck engines.

The lubricant composition for an internal combustion engine may be suitable for any engine lubricant irrespective of the sulphur, phosphorus or sulphated ash (ASTM D-874) content. The sulphur content of the engine oil lubricant may be 1 wt % or less, or 0.8 wt % or less, or 0.5 wt % or less, or 0.3 wt % or less. The phosphorus content may be 0.2 wt % or less, or 0.1 wt % or less, or 0.085 wt % or less, or even 0.06 wt % or less, 0.055 wt % or less, or 0.05 wt % or less. The total sulphated ash content may be 2 wt % or less, or 1.5 wt % or less, or 1.1 wt % or less, or 1 wt % or less, or 0.8 wt % or less, or 0.5 wt % or less.

In one embodiment the lubricating composition is an engine oil, wherein the lubricating composition has a (i) a sulphur content of 0.5 wt % or less, (ii) a phosphorus content of 0.1 wt % or less, and (iii) a sulphated ash content of 1.5 wt % or less.

In one embodiment the lubricating composition is suitable for a 2-stroke or a 4-stroke marine diesel internal combustion engine. In one embodiment the marine diesel combustion engine is a 2-stroke engine. The grafted polymer of the invention may be added to a marine diesel lubricating composition at 0.01 to 20 wt %, or 0.05 to 10 wt %, or 0.1 to 5 wt %.

Example 1

Bromination of Dyne™ 623-18 is conducted by adding 90 g of Dyne™ 623-18 to 530 g of chloroform in a one-liter flask fitted with a polytetrafluoroethylene gasket, flange lid fitted with an overhead stirrer, nitrogen inlet, water cooled condenser, and thermocouple for monitoring reaction temperature. The resulting polymer solution is stirred (300 RPM) under nitrogen (250 cc/min) for 1 hour. 6.4 g of N-bromosuccinimide (NBS) are added. The reaction mixture is stirred for 10 minutes. The reaction mixture is heated with a heat lamp through glass for 1.5 hours. The reaction mixture turns brown after 10 minutes. The reaction mixture is stirred for an additional 1 hour. One liter of isopropanol is cooled in a butanol/

CO₂ bath. The reaction mixture is added to the isopropanol dropwise with stirring over a period of 30 minutes. Precipitate is formed. The precipitate is filtered and washed with 200 ml of isopropanol, and dried in a vacuum oven 60° C. overnight. The yield of product is 72.1 g. The product is in the form of a pale brown rubber. The reaction may be represented by the following equation:

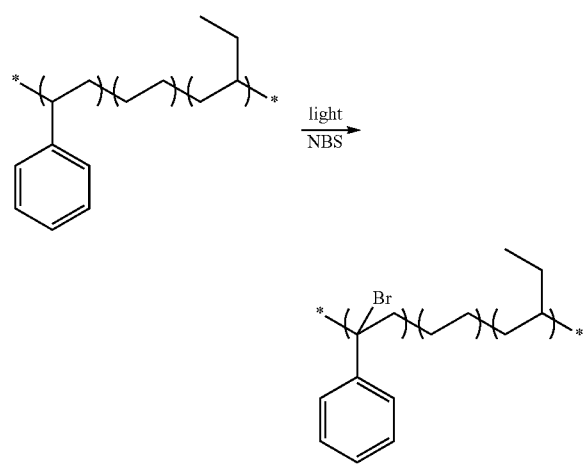

Example 2

40 g of the product from Example 1, 8.78 g of copper (I) bromide, and 20 g of maleic anhydride (MAA), are added to 400 g of toluene and stirred under nitrogen. The reaction mixture is heated to 110° C. to facilitate complete dissolution and then cooled to 60° C. 9.04 g of propyl-pyridin-2-ylmethylene-amine are added over a period of 30 minutes under nitrogen. The reaction mixture is heated to 110° C. and stirred overnight. The reaction mixture is cooled to room temperature. 800 g of isopropanol are cooled in a butanol/CO₂ bath. The reaction mixture is added to the isopropanol over a period of 30 minutes with stirring to form a suspension. The suspension is filtered to collect polymer. The polymer is washed with methanol, isopropanol and acetone. The polymer is dried in a vacuum oven overnight at 70° C. The yield of product is 37.5 g. The product is a grafted polymer in the form of a dark brown rubber. The grafted polymer may be referred to as an ATRP mediated SBR-g-MAA resin. The reaction may be represented by the following equation:

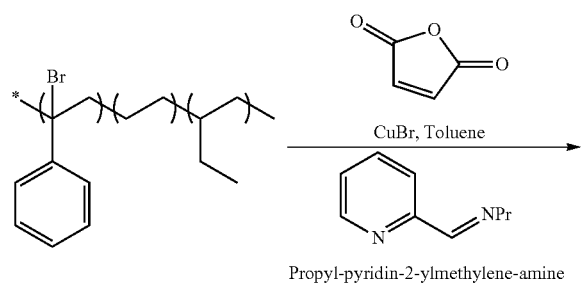

Propyl-pyridin-2-ylmethylene-amine

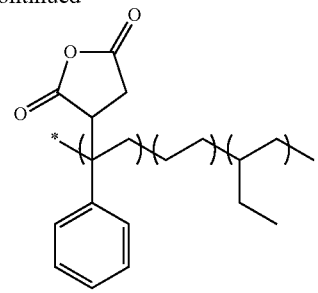

Example 3

Soot screen testing is performed on polymer samples by adding the polymer sample to a drain oil containing soot. The resulting test samples are subjected to oscillation and the ability of the polymer to reduce the buildup of associations between molecules of soot is measured as a modulus, by a method described in SAE Paper 2001-01-1967, "Understanding Soot Mediated Oil Thickening: Rotational Rheology Techniques to Determine Viscosity and Soot Structure in Peugot XUD-11 BTE Drain Oils," M. Parry, H. George, and J. Edgar, presented at International Spring Fuels & Lubricants Meeting & Exhibition, Orlando, Fla., May 7-9, 2001. This test may be referred to as the XUD-11 test. The calculated parameter is referred to as G' (Pa). The G' (Pa) of the test sample treated with a polymer additive is compared to the G' (Pa) of the drain oil without the additive, the latter of which is defined as 1.00. Values of G' (Pa) less than 1.00 indicate increasing effectiveness at soot dispersion.

Table 1 shows the soot handling capacity of an ADPA imide of ATRP mediated maleinized SBR-g-MAA (referred to below as "Grafted Polymer A") versus some commercial baselines and an extrusion grafted ADPA SBR-g-MAA imide. The order in the table ranks the DVMs in order of decreasing soot handling (lower G' ratio better for good soot handling)

|  | Actives (%) | G' (Pa) | G' ratio |
|---|---|---|---|
| Untreated Drain Oil |  | 23.430 | 1.024 |
| VM1 | 1 | 0.012 | 0.001 |
| VM2 | 1 | 0.012 | 0.001 |
| Grafted Polymer A | 1 | 0.094 | 0.004 |
| VM1 | 0.5 | 0.124 | 0.005 |
| VM3 | 1 | 0.125 | 0.005 |
| Polymer B | 0.5 | 0.256 | 0.011 |
| Grafted Polymer A | 0.5 | 0.267 | 0.011 |
| VM2 | 0.5 | 0.536 | 0.023 |
| Polymer B | 0.25 | 1.024 | 0.044 |
| VM3 | 0.5 | 1.112 | 0.047 |
| Polymer B | 1 | 1.339 | 0.057 |
| VM1 | 0.25 | 2.174 | 0.093 |
| Grafted Polymer A | 0.25 | 2.539 | 0.108 |
| VM2 | 0.25 | 4.324 | 0.185 |
| VM4 | 0.25 | 4.362 | 0.186 |
| VM4 | 1 | 5.284 | 0.226 |
| VM4 | 0.5 | 7.043 | 0.301 |

VM1 is a commercially available product of Afton, Hitec™ 5777, believed to be an ethylene-propylene olefin copolymer grafted with maleic anhydride and further reacted with 4-aminodiphenylamine.

VM2 is an ethylene-propylene olefin copolymer (20,000-30,000 Mw) grafted with 3 wt % maleic anhydride and reacted with 3-nitroaniline and disperse orange 3 to make a dispersant viscosity modifier.

VM3 is an ethylene-propylene olefin copolymer (20,000-30,000 Mw) grafted with 3 wt % maleic anhydride and reacted with 4-aminodiphenylamine succinimide dispersant viscosity modifier.

Polymer B is an extrusion grafted ADPA SBR-g-MAA imide.

VM4 is an ethylene-propylene olefin copolymer (120,000-150,000 Mw) grafted with 2 wt % maleic anhydride and reacted with 3-nitroaniline and disperse orange 3 to make a dispersant viscosity modifier.

The results show that the Grafted Polymer A and VM1 have comparable soot handling characteristics at treat levels of 1% by weight. The results may be qualified by the fact that the loading of dispersant functionality is higher for the Grafted Polymer A than for Polymer B (as determined by total acid number (TAN) analysis). This comparison highlights the ease with which higher loadings can be achieved using the inventive grafted polymer methodology. The inventive process using ATRP grafting may be highly tunable with potential dialling in of halogenation (e.g., bromination or chlorination) levels and subsequent grafting levels.

While the invention has been explained in relation to various embodiments, it is to be understood that various modifications thereof may become apparent to those skilled in the art upon reading the specification. Therefore, it is to be understood that the invention provided for herein is intended to cover such modifications as may fall within the scope of the appended claims.

What is claimed is:

1. A lubricating composition, comprising:
   a major amount of an oil of lubricating viscosity and
   a minor dispersant viscosity modifying amount of:
   a grafted hydrogenated polymer comprising a polymer backbone and a pendant carbonyl containing group, the polymer backbone comprising at least one of block A and at least one of block B, block A comprising an olefin block, block B comprising a vinyl aromatic block, the mole ratio of monomer units in block A to monomer units in the combination of block A plus block B being in the range from 0.5 to 0.9;
   substantially all of the pendant carbonyl containing group being grafted on block B, the carbonyl containing group being optionally further substituted to provide an ester, imide and/or amide functionality, the grafting of the pendant carbonyl containing group on block B being conducted by halogenating the vinyl aromatic carbon of block B with a halogenating agent which comprises N-bromosuccinimide and then grafting a carboxylic acid or derivative thereof on the vinyl aromatic carbon in the presence of an activating agent.

2. The lubricating composition of claim 1, wherein the grafted polymer comprises a copolymer that is not a tapered copolymer, and block A contains from 20 mol % to 80 mol % repeat units that contain alkyl branching groups; or wherein the grafted polymer comprises a copolymer which is a tapered copolymer, and block A contains from 40 mol % to 80 mol % repeat units that contain alkyl branching groups.

3. The lubricating composition of claim 1, wherein the polymer backbone comprises repeat units derived from an aliphatic diene and repeat units derived from an alkenyl arene.

4. The lubricating composition of claim 1, wherein the polymer backbone comprises repeat units derived from styrene and butadiene.

5. The lubricating composition of claim 1, wherein the grafted polymer comprises a diblock copolymer, a sequential block copolymer, or a mixture thereof.

6. The lubricating composition of claim 1, wherein the carboxylic acid derivative comprises an anhydride, halide, or alkyl ester.

7. The lubricating composition of claim 1, wherein the grafted polymer has a weight average molecular weight in the range from 1000 to 1,000,000 and/or a polydispersity in the range from 1 to 1.6.

8. The lubricating composition of claim 1 wherein the grafted polymer comprises double bonds available for hydrogenation and from 95 to 100% of the double bonds available for hydrogenation are hydrogenated.

9. The lubricating composition of claim 1, wherein the carbonyl containing group is substituted to provide amide and/or imide functionality, the amide and/or imide functionality being provided by a nitrogen containing monomer or an amine.

10. The lubricating composition of claim 1 wherein the composition further comprises a dispersant, detergent, antioxidant, antiwear agent, friction modifier, or a mixture of two or more thereof.

11. The lubricating composition of claim 1, wherein the lubricating composition is an engine oil, and wherein the lubricating composition has at least one of (i) a sulphur content of 0.8 wt % or less, (ii) a phosphorus content of 0.2 wt % or less, or (iii) a sulphated ash content of 2 wt % or less.

12. The lubricating composition of claim 1 wherein the activating agent comprises copper (I) bromide.

13. The lubricating composition of claim 1 wherein the grafted polymer is present in an amount of 0.7 to about 10 percent by weight.

14. A lubricating composition, comprising:
   a major amount of an oil of lubricating viscosity and
   a minor dispersant viscosity modifying amount of 0.7 to about 10 percent by weight of:
   a grafted hydrogenated polymer comprising a polymer backbone and a pendant carbonyl containing group, the polymer backbone comprising at least one of block A and at least one of block B, block A comprising an olefin block, block B comprising a vinyl aromatic block, the mole ratio of monomer units in block A to monomer units in the combination of block A plus block B being in the range from 0.5 to 0.9;
   substantially all of the pendant carbonyl containing group being grafted on block B, the carbonyl containing group being optionally further substituted to provide an ester, imide and/or amide functionality, the grafting of the pendant carbonyl containing group on block B being conducted by halogenating the vinyl aromatic carbon of block B with a halogenating agent which comprises N-bromosuccinimide and then grafting a carboxylic acid or derivative thereof on the vinyl aromatic carbon in the presence of an activating agent which comprises copper (I) bromide.

* * * * *